J. MONSOS.
COMBINED PUNCH AND SHEAR.
APPLICATION FILED JAN. 24, 1910.
973,124.
Patented Oct. 18, 1910.
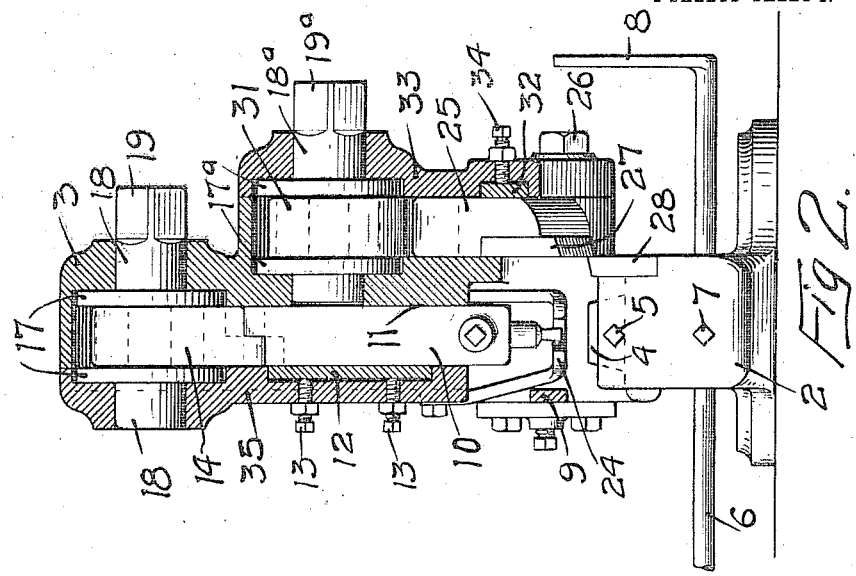
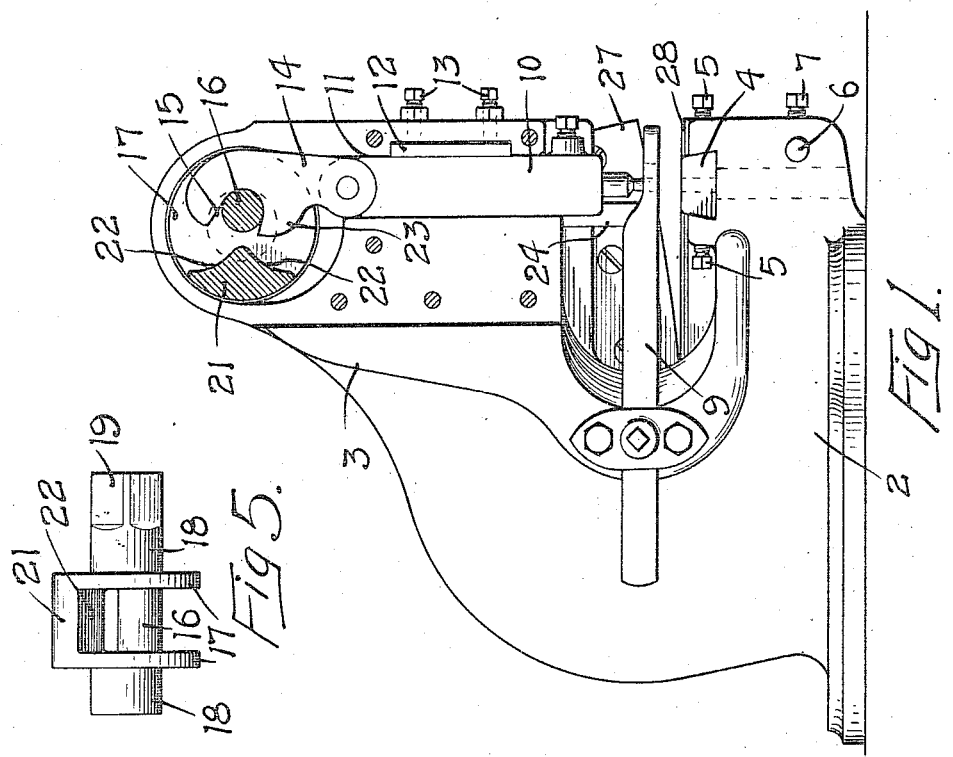
WITNESSES
INVENTOR
JACOB MONSOS
BY Paul & Paul
ATTORNEYS

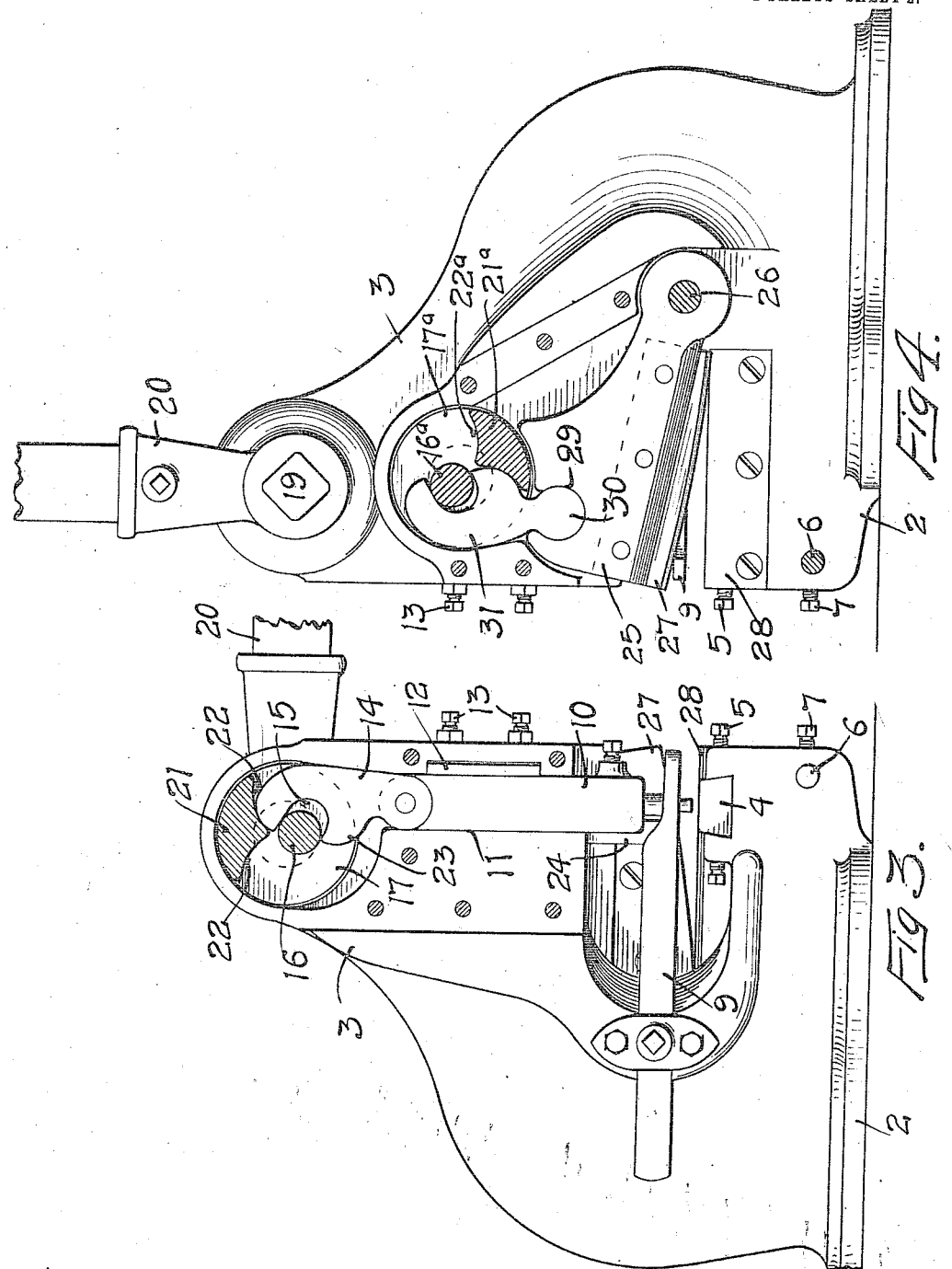

UNITED STATES PATENT OFFICE.

JACOB MONSOS, OF MINNEAPOLIS, MINNESOTA.

COMBINED PUNCH AND SHEAR.

973,124.

Specification of Letters Patent.   Patented Oct. 18, 1910.

Application filed January 24, 1910.   Serial No. 539,801.

*To all whom it may concern:*

Be it known that I, JACOB MONSOS, of Minneapolis, Hennepin county, Minnesota, have invented certain new and useful Improvements in Combined Punches and Shears, of which the following is a specification.

The object of my invention is to provide a machine by means of which a bar or plate of metal can be easily and quickly punched or cut off.

A further and particular object of the invention is to provide a machine having great power and one that will be very strong and durable.

My invention consists generally in various constructions and combinations, all as hereinafter described and particularly pointed out in the claims.

In the accompanying drawings forming part of this specification, Figure 1 is a side elevation, partially in section, illustrating the punching mechanism in its raised position, Fig. 2 is a vertical sectional view of the same on a line substantially at right angles to the section line in Fig. 1, Fig. 3 is a side elevation, partially in section, illustrating the punching mechanism in its depressed position, Fig. 4 is a similar view showing the shearing device and the means for operating the same, Fig. 5 is a detail view illustrating the plunger actuating device.

In the drawing, 2 represents the base of the machine having an upwardly extending bracket or standard 3 overhanging the base. An anvil or die 4 is mounted in the base, secured by screws 5, and a gage rod 6 is also mounted in said base secured by a screw 7 and having an upwardly turned end 8 by means of which the operator can regulate the distance between the holes punched and the length of the bar to be sheared off. The adjustable bar 9 overhangs the base and anvil and prevents the plate or bar operated on from flying upward during the punching or shearing operation.

10 is a plunger, vertically slidable in a guide way 11 in the bracket 3 and provided with plates 12 adjustable by means of screws 13 to bear against the plunger and take up the wear or lost motion thereof, holding it against the opposite fixed walls of the guide way.

The link 14 is pivotally connected to the upper end of the plunger and has a recess 15 therein that is adapted to receive a crank pin or eccentric 16 that is provided between disks 17 having trunnions 18 which are journaled in the upper portion of the bracket 3. One trunnion has an end 19 to receive an operating lever 20. A bar 21 connects the disks at their peripheries and this bar, with the crank and disks, are all preferably formed of a single casting, the bar 21 being preferably triangular in cross section and provided with concave faces 22.

In the operation of the machine, the crank 16 exerts a downward pressure on the link 14, forcing the plunger 10 downwardly and pressing the punch through the material on the anvil or partially therethrough. The crank has a great leverage on the link to perform the initial punching operation, and when this has been done the surface 22 of the bar 21 will contact with the end of the link, as shown clearly in Fig. 3 and complete the punching operation, the bar having less leverage on the link than the crank, but exerting sufficient force to guide the punch the remaining distance through the material. Upon the return stroke, the opposite side of the bar 21 will contact with the heel 23 of the link 14 and raise the plunger, disengaging the punch from the material, the stripper 24 preventing the material from following the punch, as usual in machines of this kind.

In Fig. 4 I have illustrated a shearing lever 25 pivoted at 26 on the base and carrying a shear knife blade 27, having an edge to coöperate with the stationary plate 28. The lever has a socket 29 to receive a rounded lower end 30 on the link 31 and a similar operating mechanism is provided for the link 31 to the one described above and I will therefore designate it by the same reference numerals with the addition of the exponent "a." The crank operates in the recess in the link in the same manner as described, the initial shearing movement being performed by the pressure of the crank on the link, while the remainder of the stroke is completed by the engagement of the bar 21 with the upper end of the link. A take-up plate 32 is arranged within the removable side plate 33 on the machine and adjusted by means of a screw 34, and one of the plates 12 is similarly mounted in a removable plate 35 on the opposite side of the machine. Upon the removal of these side plates, access may be had to the operating mechanism.

I do not wish to be confined herein to the precise details of construction shown and described, as in various ways the mechanism may be modified without departing from the scope of my invention.

I claim as my invention:—

1. A machine of the class described comprising a base, a bracket overhanging said base, a plunger vertically slidable in said bracket, a punch carried thereby, a link pivotally connected with said plunger and having a recess, a crank having bearings in said bracket and rotating therein and adapted to enter said recess, said crank exerting a downward pressure on said link and plunger to perform the initial punching operation, and means inoperative during the initial movement of said link but becoming operative during its subsequent movement to complete the punching operation.

2. An apparatus of the class described comprising a base, a bracket overhanging said base, a plunger vertically slidable in said bracket, a link pivotally connected with said plunger, means arranged to exert a downward pressure on said link and plunger to perform the initial punching operation, and means temporarily inoperative during the initial punching movement but becoming operative during its subsequent movement to complete the punching operation.

3. A device of the class described, comprising a base, a bracket, a vertically sliding plunger, a link pivotally connected with said plunger, a crank having bearings in said bracket and adapted to enter a recess provided in said link, said crank revolving in its bearings and adapted to exert a downward pressure on said link and plunger, and a bar temporarily inoperative during the initial movement of said link but arranged to engage the same and force said link and plunger downward after their initial movement.

4. In a machine of the class described, an oscillating lever having a shear knife blade, a link having a ball and socket connection with said lever and provided with a recess, a crank having bearings and fitting within the recess in said link and exerting a downward pressure on said link to perform the initial shearing operation, and means engaging said link subsequent to its initial movement to complete the shearing operation.

5. In a machine of the class described, a link having a recess, disks having trunnions and bearings therefor, a crank between said disks adapted to enter said recess, a bar connecting the peripheries of said disks and normally out of engagement with said link but adapted to contact therewith during the last part of the stroke of said link, and a metal working tool operatively connected with said link.

In witness whereof, I have hereunto set my hand this 14" day of January 1910.

JACOB MONSOS.

Witnesses:
L. C. CRONEN,
G. E. SORENSEN.